United States Patent
Yendigiri et al.

(10) Patent No.: US 9,129,068 B2
(45) Date of Patent: Sep. 8, 2015

(54) METHODS AND STRUCTURE FOR BUFFERING HOST REQUESTS IN SERIAL ATTACHED SCSI EXPANDERS

(71) Applicant: LSI CORPORATION, San Jose, CA (US)

(72) Inventors: Prashant Prakash Yendigiri, Bangalore (IN); Giridhar Danayakanakeri, Bangalore (IN); Raghavendra C. Nagendra, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 380 days.

(21) Appl. No.: 13/734,099

(22) Filed: Jan. 4, 2013

(65) Prior Publication Data

US 2014/0195714 A1  Jul. 10, 2014

(51) Int. Cl.
*G06F 13/40* (2006.01)
*H04L 12/861* (2013.01)

(52) U.S. Cl.
CPC ........ *G06F 13/4022* (2013.01); *G06F 13/4027* (2013.01); *G06F 13/4059* (2013.01); *H04L 49/90* (2013.01)

(58) Field of Classification Search
CPC .. G06F 13/4059; G06F 13/4027; H04L 49/90
See application file for complete search history.

(56) References Cited

U.S. PATENT DOCUMENTS

| | | | |
|---|---|---|---|
| 2008/0040564 A1* | 2/2008 | Kubo et al. | 711/154 |
| 2011/0320706 A1* | 12/2011 | Nakajima | 711/114 |
| 2013/0198465 A1* | 8/2013 | Suzuki et al. | 711/158 |
| 2014/0032979 A1* | 1/2014 | Singh | 714/48 |

FOREIGN PATENT DOCUMENTS

EP     2052326 B1     8/2012

* cited by examiner

*Primary Examiner* — Glenn A Auve
(74) *Attorney, Agent, or Firm* — Duft Bornsen & Fettig

(57) ABSTRACT

Methods and structure are provided for "spoofing" an active connection between a Serial Attached SCSI (SAS) initiator and a SAS target. The structure includes a SAS expander, comprising multiple physical links with associated transceivers (PHYs), switching hardware, a memory, and a control unit. Each PHY is operable to receive incoming Open Address Frames (OAFs) from SAS initiators that request connections with target devices. The switching hardware is operable to selectively link PHYs of the expander with each other to enable connections between initiators and target devices. The control unit is operable to determine that a connection requested by a received OAF cannot be completed, is operable to transmit an OPEN ACCEPT to the SAS initiator that transmitted the OAF responsive to making the determination, and is operable to store I/O received from the SAS initiator for the requested connection in the memory, responsive to transmitting the OPEN ACCEPT.

20 Claims, 7 Drawing Sheets

SINGLE ENHANCED SAS EXPANDER COUPLED WITH
END DEVICE – BUSY PHY

METHODS AND STRUCTURE FOR
BUFFERING HOST REQUESTS IN SERIAL
ATTACHED SCSI EXPANDERS

BACKGROUND

1. Field of the Invention

The invention relates generally to Serial Attached SCSI (SAS) technology, and in particular relates to SAS expanders.

2. Discussion of Related Art

In SAS domains (i.e., electronic systems implementing a switched SAS fabric) it is common for a SAS initiator to communicate with a large number of SAS or Serial Advanced Technology Attachment (SATA) target devices. The target devices may comprise, for example, SAS/SATA storage devices that provision one or more logical volumes of data. In a SAS domain, the target devices may be coupled for communication with the initiator via one or more SAS expanders. The SAS expanders establish switched temporary communication channels between the initiator and the various target devices.

Each SAS expander includes multiple physical links and associated transceivers. The combination of a physical link and its associated transceiver is referred to in SAS as a PHY. Each PHY can be coupled with a SAS device that is external to the expander. Thus, an operating SAS expander is coupled with multiple external devices via multiple PHYs. For example, the PHYs of a SAS expander may be coupled with other SAS expanders, with target devices, with SAS initiators, etc.

The PHYs of an expander are electrically connected with each other via switching hardware, such as a crossbar switch. Whenever a request is received at the expander, the switching hardware in the expander can be used to link different PHYs of the expander to each other, in order to send the request onward towards its destination. An example of a request processed by an expander is an Open Address Frame (OAF), which is used to establish a point-to-point connection between a SAS initiator and a target device. The set of PHYs in a SAS domain that are used to establish a connection between a SAS initiator and a target device is referred to as a pathway. Further descriptions of SAS devices and interactions are included in the SAS 2.0, revision 16 specifications, issued by the T10 committee on 18 Apr. 2009 and herein incorporated by reference.

Because SAS expanders often establish multiple connections between devices at once, it is not uncommon for requests received at an expander to be directed towards PHYs that are already actively servicing a point-to-point connection. For example, if an existing connection uses a pathway that couples a first PHY with a second PHY at the expander, then a third PHY cannot establish a different connection with either the first PHY or second PHY at this time. In these circumstances where an incoming host request (i.e., an OAF) is directed to a PHY that is busy with a previously established connection, the host request is ignored/dropped by the expander and the expander may reply to the request with an OPEN REJECT (RETRY).

The device that originated the request (e.g., a SAS initiator) waits for a response to its request, and then determines that the request has been dropped. Therefore, the requesting device must send the request again in the hope that an available connection is now open. Re-sending requests increases the workload at the requesting device, but does not improve the speed at which the requesting device processes host Input and/or Output (I/O). Therefore, the extra processing does not enhance the performance of the SAS domain.

Thus it is an ongoing challenge to enhance the performance of SAS domains in processing requests sent between devices of the domain.

SUMMARY

The present invention addresses the above and other problems, thereby advancing the state of the useful arts, by providing methods and structure for SAS expanders to "spoof" the existence of a connection to a SAS initiator, even though the connection is not actually currently available. The SAS expanders store incoming I/O from the SAS initiator in memory, even though the requested connection cannot be currently made with the target device. In this manner, incoming requests are not rejected or dropped outright, but rather are held by the expander and then processed as soon as the connection becomes available.

In one aspect hereof, a method is provided for operating a Serial Attached SCSI (SAS) expander comprising multiple physical links with associated transceivers (PHYs), wherein each PHY is operable to receive incoming Open Address Frames (OAFs) from SAS initiators that request connections with target devices. The method comprises receiving, at the SAS expander, an OAF from a SAS initiator, and determining, at a control unit of the SAS expander, that a connection requested by the received OAF cannot be completed. The method further comprises transmitting, via the expander, an OPEN ACCEPT to the SAS initiator that transmitted the OAF responsive to making the determination, and storing incoming I/O received from the SAS initiator for the requested connection in a memory of the SAS expander, responsive to transmitting the OPEN ACCEPT.

Another aspect hereof provides a Serial Attached SCSI (SAS) expander, comprising multiple physical links with associated transceivers (PHYs), switching hardware, a memory, and a control unit. Each PHY is operable to receive incoming Open Address Frames (OAFs) from SAS initiators that request connections with target devices. The switching hardware is operable to selectively link the PHYs of the expander with each other to enable connections between initiators and target devices. The control unit is operable to determine that a connection requested by a received OAF cannot be completed, is operable to transmit an OPEN ACCEPT to the SAS initiator that transmitted the OAF responsive to making the determination, and is operable to store incoming I/O received from the SAS initiator for the requested connection in the memory, responsive to transmitting the OPEN ACCEPT.

Other exemplary embodiments (e.g., methods and computer-readable media relating to the foregoing embodiments) may be described below.

DETAILED DESCRIPTION OF THE DRAWINGS

Figure 1:
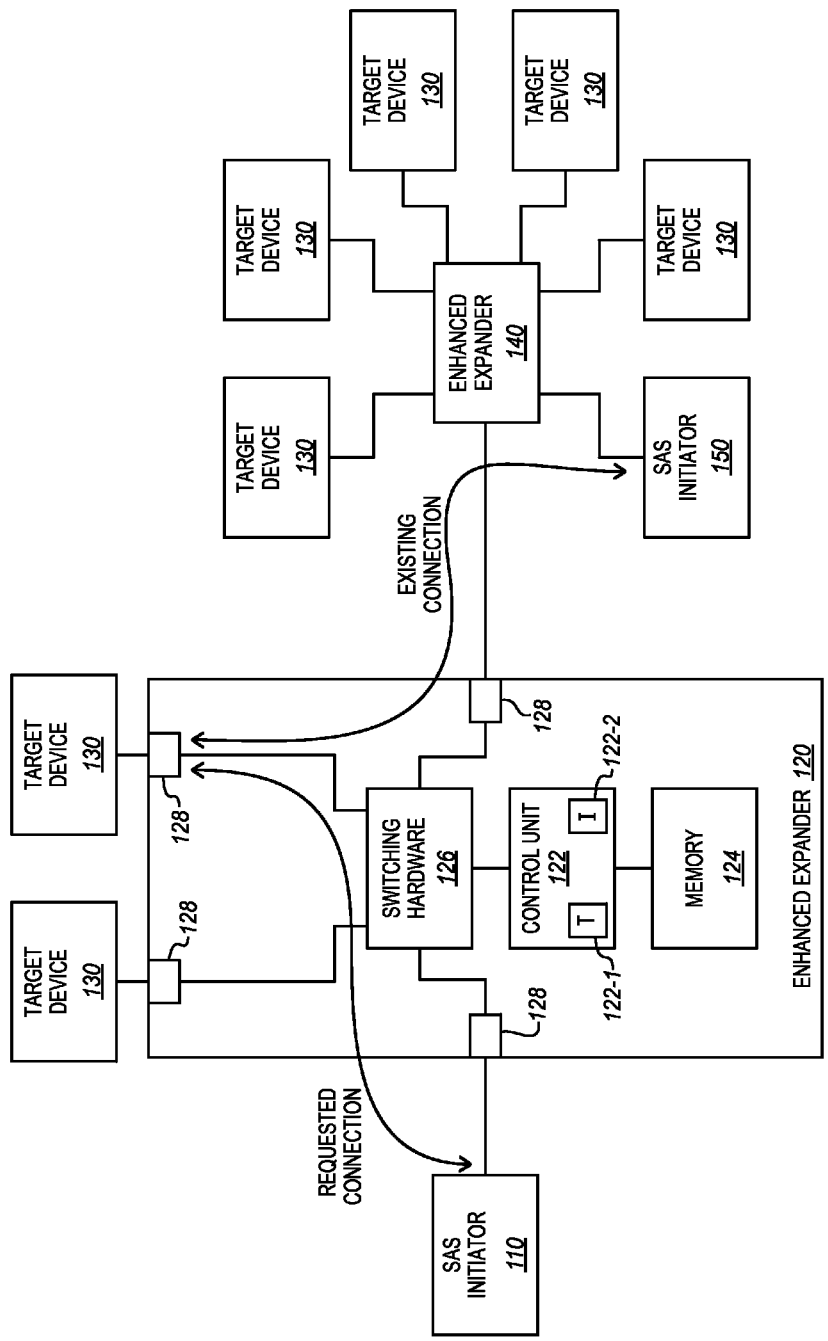
FIG. 1 is a block diagram of an exemplary SAS domain in accordance with features and aspects hereof

FIG. 1 is a block diagram of an exemplary SAS domain 100 in accordance with features and aspects hereof SAS domain 100 includes SAS initiators 110 and 150, numerous target devices 130, and enhanced expanders 120 and 140. The enhanced expanders of FIG. 1 are capable of receiving requests such as Open Address Frames (OAFs) from SAS initiators 110 and 150, and storing data from incoming requests in memory if a connection cannot be currently established with a requested end device. At the same time, the enhanced expanders respond to the SAS initiators' OAFs with OPEN ACCEPT messages instead of OPEN REJECT (RETRY) messages. In this manner, the expander can "spoof" a connection between a SAS initiator and an unavailable target device 130. Thus, the SAS initiators need not waste any processing power or time in re-trying their requests, and may immediately send data towards a target device 130.

SAS initiators 110 and 150 send requests, such as OAFs, to various target devices 130 in order to interact with target devices 130. SAS initiators 110 and 150 may comprise any suitable SAS devices capable of assuming the role of an initiator as defined by the SAS specifications. For example, SAS initiators 110 and 150 may each comprise a Host Bus Adapter (HBA) of a host system.

Target devices 130 receive and process the requests received from SAS initiators 110 and 150. Target devices 130 may comprise any suitable devices that are compatible with a SAS environment. For example, target devices 130 may comprise SAS/SATA targets such as storage devices/systems that process incoming I/O from SAS initiators 110 and 150.

Enhanced expanders 120 and 140 are located between the SAS initiators of SAS domain 100 and the target devices of SAS domain 100. Expanders 120 and 140 establish connections between SAS initiators and requested targets so that these devices may communicate with each other. In this embodiment, enhanced expander 120 includes control unit 122, memory 124, switching hardware 126, and multiple PHYs 128.

Switching hardware 126 is operable to electrically link PHYs of expander 120 to each other in order to establish connections between the devices of SAS domain 100. Switching hardware 126 may comprise a crossbar switch or other appropriate circuitry capable of performing this task.

Control unit 122 manages the operations of SAS expander 120, including the operations of switching hardware 126. Because SAS utilizes point-to-point connections, SAS does not support maintaining multiple connections through one PHY simultaneously. Therefore, in typical SAS, incoming requests received at an expander that are directed to busy PHYs would be dropped, resulting in an expander providing an OPEN REJECT (RETRY) to the initiator that sent the request. The initiator would then re-try the request until the connection was open. To address this issue, control unit 122 has been enhanced to store I/O from incoming requests that are directed to busy PHYs. Therefore, even when a request is directed to a busy PHY that is utilizing a connection, control unit 122 responds to an initiator's requests with affirmative acknowledgments (e.g., an OPEN ACCEPT primitive sent in response to a received OAF, etc.). In this way, the SAS initiators that generate the requests do not constantly retry their failed requests, which frees up more time for the initiators to process host I/O.

Control unit 122 may be implemented, for example, as custom circuitry, as a special or general purpose processor executing programmed instructions stored in an associated program memory, or some combination thereof.

In one embodiment, control unit 122 includes internal logic and/or circuitry that implements a SAS target 122-1 as well as a SAS initiator 122-2. In this embodiment, SAS target 122-1 is capable of receiving incoming requests that are directed to busy PHYs, as well as generating appropriate SAS responses to be sent to a SAS initiator. SAS initiator 122-2 is capable of generating SAS commands, based on I/O requests stored in memory 124, to interact with target devices once a connection has been established.

Control unit 122 uses memory 124 to store I/O from incoming requests that are directed to PHYs that are busy with an existing connection. Memory 124 need not store the entirety of each received request, but may optionally do so. Typically, instead of storing entire Open Address Frames (OAFs) sent by an initiator, memory 124 may store an indicator to generate an OAF, as well as a SAS address for the target devices to which the OAF should be directed. In another example, memory 124 may store payload data from incoming requests (e.g., the data to be written in a write command, the addresses to read from in a read command, etc.) instead of the entire requests themselves.

Memory 124 comprises any suitable component or device capable of storing data. For example, memory 124 may comprise semiconductor memory such as Random Access Memory (RAM, e.g., double data rate type three synchronous dynamic random access memory, such as DDR3 SDRAM), hardware registers, etc.

Enhanced SAS expander 140 may comprise a similar arrangement of components and devices to enhanced SAS expander 120.

Note that the particular arrangement of components described herein is merely intended to be exemplary, and one of ordinary skill in the art will appreciate that the specific arrangement and configuration of SAS devices in a SAS domain is merely a matter of design choice. Furthermore, the specific arrangement and configuration of components of a SAS expander may also vary as a matter of design choice.

While in operation, an enhanced SAS expander is operable to process incoming requests from SAS initiators 110 and 150. These requests include, for example, OAFs that request the establishment of point-to-point connections between SAS initiators and target devices. If a connection cannot be established with a target device, then the enhanced expander is capable of sending an OPEN ACCEPT to the SAS initiator. The enhanced expander then stores incoming I/O from the initiator (e.g., payload data from read commands, write commands, etc.) in memory, and initiates the requested connection with the requested target device when the connection becomes available.

For example, the connection may become available when a previously busy PHY at the expander becomes free to service a new connection. The expander may then issue commands to the requested target device based on the I/O stored in the expander's memory. New commands may continue to be generated by the enhanced expander until all of the stored I/O has been processed. At this point, incoming commands from the SAS initiator are directly provided to the requested device by the expander, and the connection between the SAS initiator and the requested device is operated as in a normal SAS environment.

Figure 2:
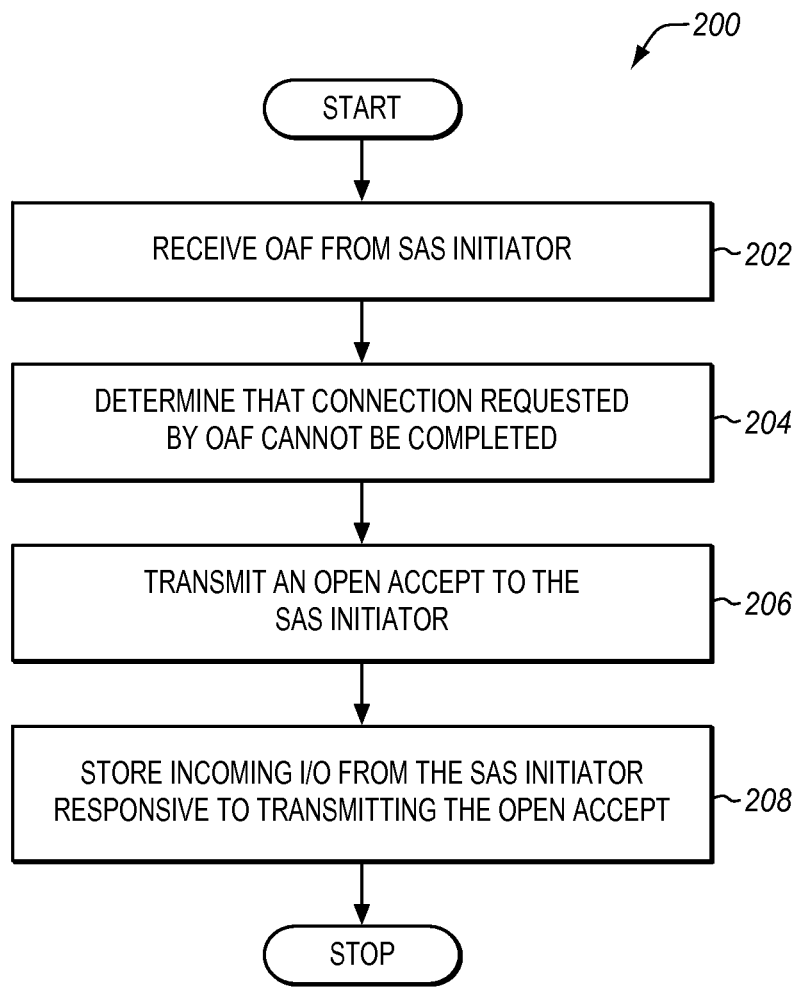
FIG. 2 is a flowchart describing an exemplary method of operating an enhanced SAS expander in accordance with features and aspects hereof.

FIG. 2 is a flowchart describing an exemplary method 200 of operating an enhanced SAS expander in accordance with features and aspects hereof. The method of FIG. 2 may be operable in a SAS domain such as described above with regard to FIG. 1. The steps of the flowcharts described herein are not all inclusive and may include other steps not shown. The steps described herein may also be performed in an alternative order.

In step 202, a PHY of the SAS expander receives an OAF from a SAS initiator. The OAF includes a SAS address for a requested target device. A control unit of the expander then checks an internal routing table to identify which PHY is used to establish a connection with the requested target device. If the request can be completed and the identified PHY is not busy, the control unit may utilize switching hardware at the expander to link the PHY that received the OAF with the identified PHY and thereby establish a connection. However, in many cases, an identified PHY of the expander is already busy servicing a different connection, or a connection cannot be established because a PHY of a downstream device is busy. Steps 204-208 detail how the expander responds to such situations.

In step 204, the control unit of the SAS expander determines that a connection requested by the received OAF cannot be completed. For example, the SAS expander may determine, based on internal memory, that a PHY of the expander that would be used for the requested connection is already busy servicing a different connection. The control unit may make this determination by checking a register or other memory structure at the expander that indicates the current PHYs which are presently servicing connections at the expander.

In one embodiment, the control unit determines that a requested connection cannot be completed when it propagates the OAF downstream towards the target device, and receives an OPEN REJECT (RETRY) from a downstream device in response to the OAF.

Once the connection is determined to be unavailable, the control unit operates the expander to transmit an OPEN ACCEPT to the SAS initiator that transmitted the OAF in step 206. This serves to establish a connection with the SAS initiator, and makes the SAS expander act in the role of the target device that the SAS initiator requested a connection with.

Once the SAS initiator has received the OPEN ACCEPT, the SAS initiator sends commands toward the target device. These commands are received at the expander, and may include I/O for various reads, writes, or other directives.

In step 208, the control unit stores the incoming I/O from the SAS initiator for the requested connection in a memory of the SAS expander. This I/O stored in the memory can be entire commands/frames received from the SAS initiator, or may comprise enough data so that the SAS initiator's commands can be generated again at the expander once the busy PHY is available for the requested connection. For example, the I/O may include "payload data" (i.e., the actual data to be written) as well as address information (e.g., a header, such as a header indicating the sender and recipient) for each command. In one embodiment, the stored I/O is queued in the order in which it is received, so that commands from the SAS initiator will be provided to the target device in the appropriate order.

Figure 3:
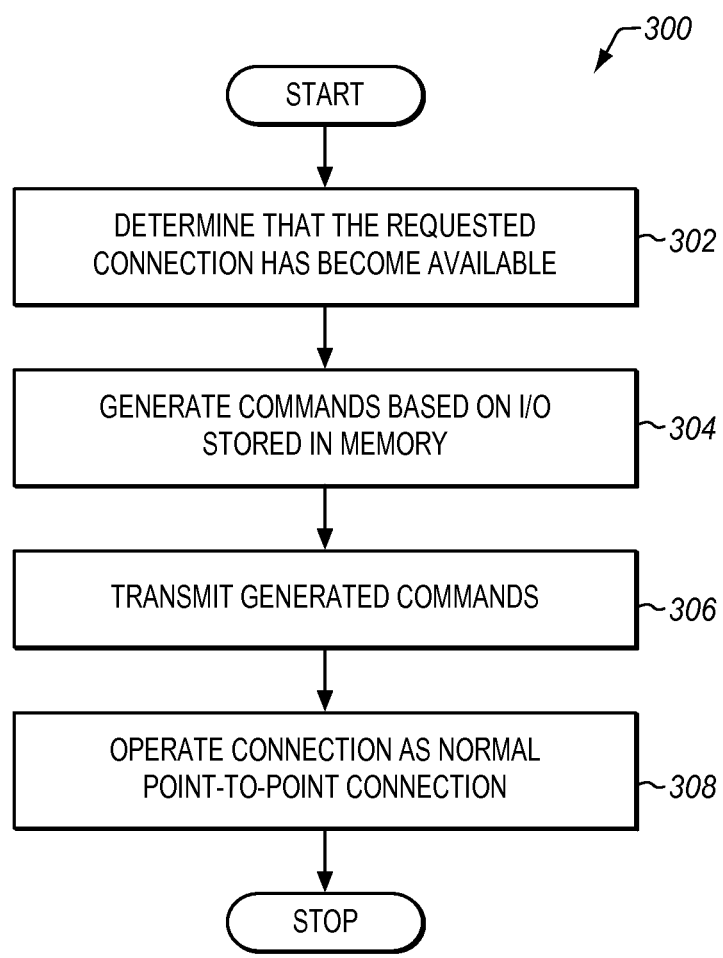
FIG. 3 is a flowchart describing further operations of an exemplary method of operating an enhanced SAS expander in accordance with features and aspects hereof.

FIG. 3 is a flowchart describing further operations of an exemplary method 300 of operating an enhanced SAS expander in accordance with features and aspects hereof. For example, the steps of method 300 may be performed after the steps of method 200.

In step 302, the SAS expander determines that a requested connection has become available. If the connection was originally unavailable because a downstream device replied to an OAF with an OPEN REJECT (RETRY), the SAS expander may continue re-sending OAFs toward the target device until an OPEN ACCEPT is received instead of an OPEN REJECT (RETRY). Alternatively, if the connection was unavailable because a PHY of the expander was previously busy, the control unit may detect that the PHY is now available by checking an internal memory. The control unit may then send an OAF to the target device along the previously busy PHY. If an OPEN REJECT (RETRY) is received from the target device, the control unit may further re-send the OAF until an OPEN ACCEPT is received. If no OPEN ACCEPT is received after many retries, a timeout may occur and the control unit may indicate to the initiator that an error has been encountered.

Once a connection has been established with the target device, the control unit generates commands based on the stored I/O in step 304, and transmits the commands along the connection to the target device in step 306. This may involve retrieving addressing information and payload data stored in memory, and then generating full SAS/SATA read or write commands based on the retrieved data. During this process, the SAS expander may continue to store I/O from incoming requests sent by the SAS initiator.

The target device generates responses to the commands, which are provided to the SAS initiator over the point-to-point connection. The expander may continue to generate and send commands until there is no remaining I/O from the initiator stored in memory. Once all of the stored commands for the connection have been successfully generated, transmitted, and processed, the SAS expander may then operate the point-to-point connection between the SAS initiator and the target device as a normal, passthrough point-to-point connection in step 308 (e.g., the connection may be operated in the same manner that connections are serviced in normally operating SAS systems).

Figure 4:
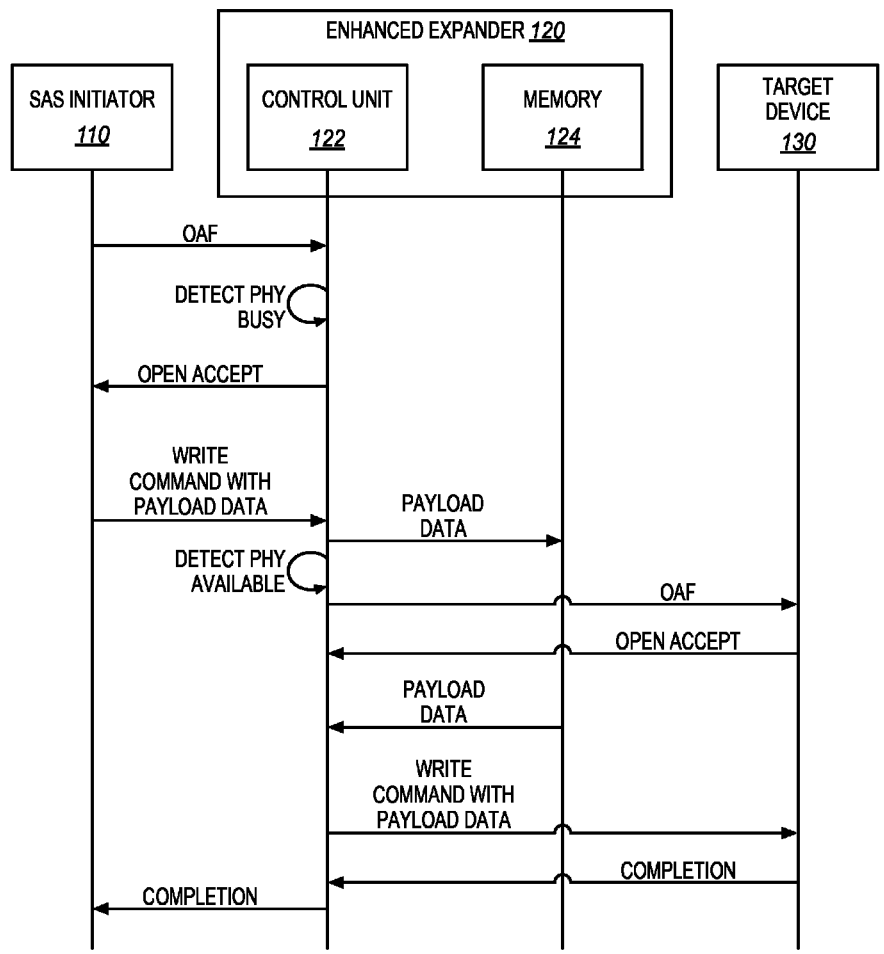
FIG. 4 is a message diagram illustrating exemplary communications between a SAS expander, a SAS initiator, and a SAS target in accordance with features and aspects hereof.

FIG. 4 is a message diagram illustrating exemplary communications between a SAS expander, a SAS initiator, and a SAS target in accordance with features and aspects hereof. FIG. 4 illustrates an example of a SAS expander 120 implementing an exemplary method 200 described in FIG. 2 in combination with an exemplary method 300 of FIG. 3. In this example, after an OAF is received from SAS initiator 110 at expander 120, expander 120 determines that one of its PHYs is currently busy. Therefore, expander 120 sends off an OPEN ACCEPT to SAS initiator 110, and stores payload data from SAS initiator 110 in memory 124 while the PHY remains busy. Once the PHY becomes available, this stored payload data is used by SAS expander 120 to generate commands for a target device 130 after the PHY later becomes available.

Figure 5:
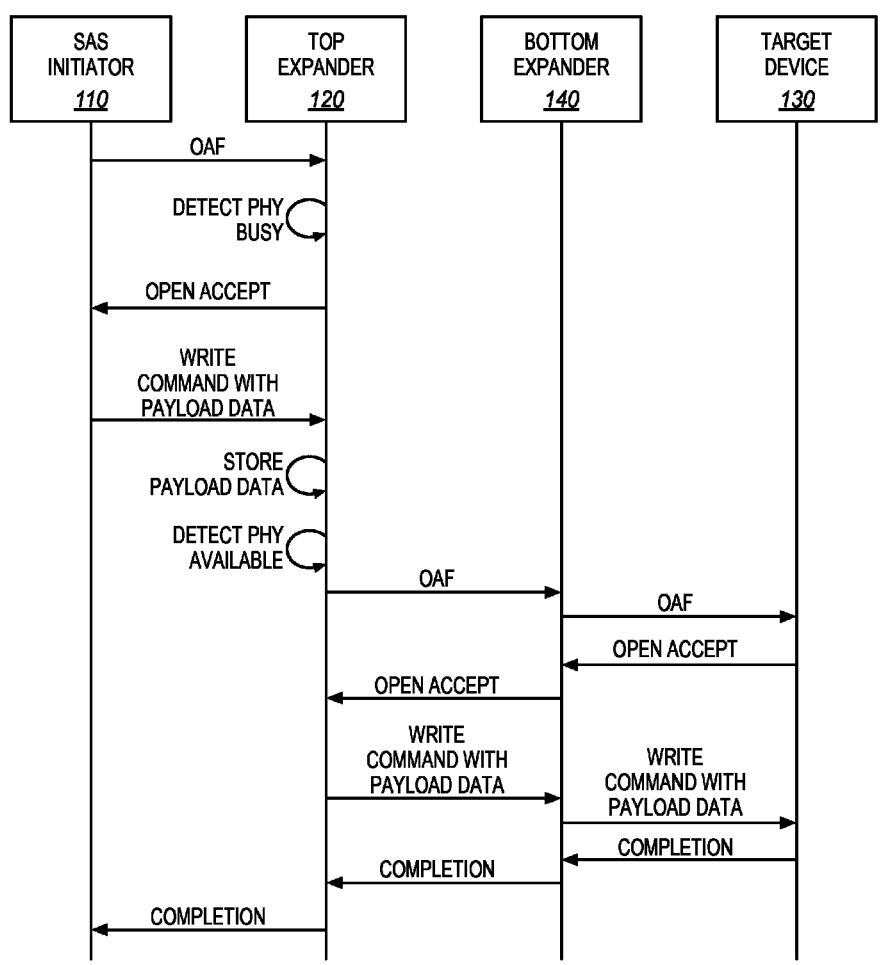
FIG. 5 is a message diagram illustrating exemplary communications between two SAS expanders, a SAS initiator, and a SAS target in accordance with features and aspects hereof.

FIG. 5 is a message diagram illustrating exemplary communications between two enhanced SAS expanders, a SAS initiator, and a SAS target in accordance with features and aspects hereof. In this embodiment, a "top expander" 120 and a "bottom expander" 140 are used to connect with the target device 130, and bottom expander 140 has a busy PHY. As described herein, top expander 120 is referred to as such because it is more "upstream" and therefore closer to SAS initiator 110 than bottom expander 140 is.

According to FIG. 5, top expander 120 performs an exemplary implementation of method 200 of FIG. 2 and method 300 of FIG. 3, while bottom expander 140 operates as a normal SAS expander (because no PHY used for the connection is busy at bottom expander 140).

Note that while FIG. 5 illustrates situations where an exemplary method is applied in a SAS domain that includes two SAS expanders, the methods described herein may be applied to any expander in any configuration of a SAS domain. In fact, the methods may be applied even if there is only one enhanced expander among many expanders of a SAS domain. Furthermore, the methods may be utilized by multiple expanders at once if there are busy PHYs at each expander, and multiple instances of the methods may even be performed concurrently on the same expander.

Figure 6:
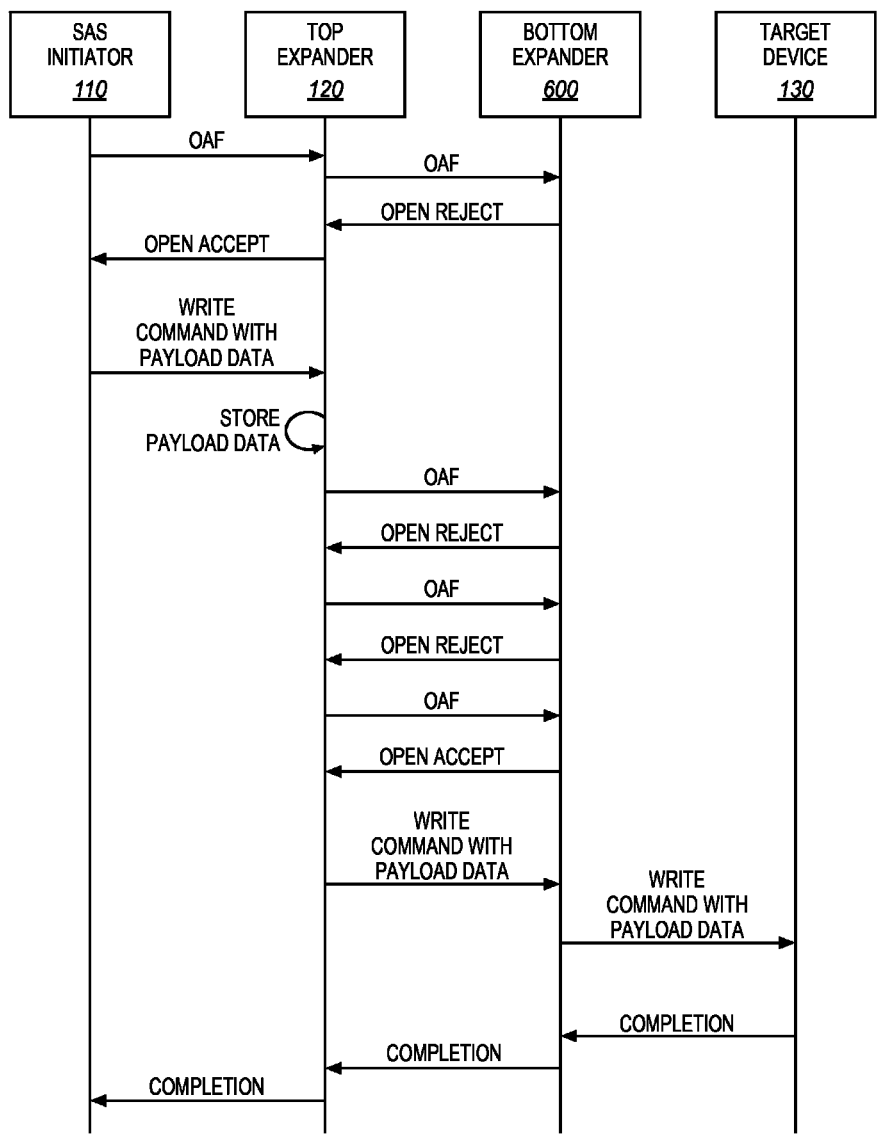
FIG. 6 is a message diagram illustrating further exemplary communications between two SAS expanders, a SAS initiator, and a SAS target in accordance with features and aspects hereof.

FIG. 6 is a message diagram illustrating further exemplary communications between two SAS expanders, a SAS initiator, and a SAS target in accordance with features and aspects hereof. In this embodiment, bottom expander 600 is not an enhanced expander, but operates as a standard SAS expander. Bottom expander 600 includes a busy PHY that would normally be used to establish a connection with target device 130.

In this embodiment, enhanced top expander 120 receives an OAF from SAS initiator 110, and forwards the OAF to bottom expander 600. Because bottom expander 600 cannot presently service the connection (owing to its busy PHY), bottom expander 600 sends an OPEN REJECT (RETRY) to top expander 120. Top expander 120 determines at this point that the connection requested by SAS initiator 110 cannot be serviced, but sends an OPEN ACCEPT to SAS initiator in order to spoof a connection with target device 130. Top expander 120 therefore receives incoming commands from SAS initiator 110, and stores the payload data from these commands in memory. Meanwhile, top expander 120 proceeds to re-try establishing a connection with bottom expander 600. Top expander 120 therefore sends OAFs to bottom expander 600 until an OPEN ACCEPT (instead of an OPEN REJECT) is received. Once the OPEN ACCEPT has been received, top expander 120 generates commands based on the stored payload data, and sends off these commands to target device 130. In this manner, top expander 120 can account for unavailable connections that are not directly caused by its own PHYs.

Figure 7:
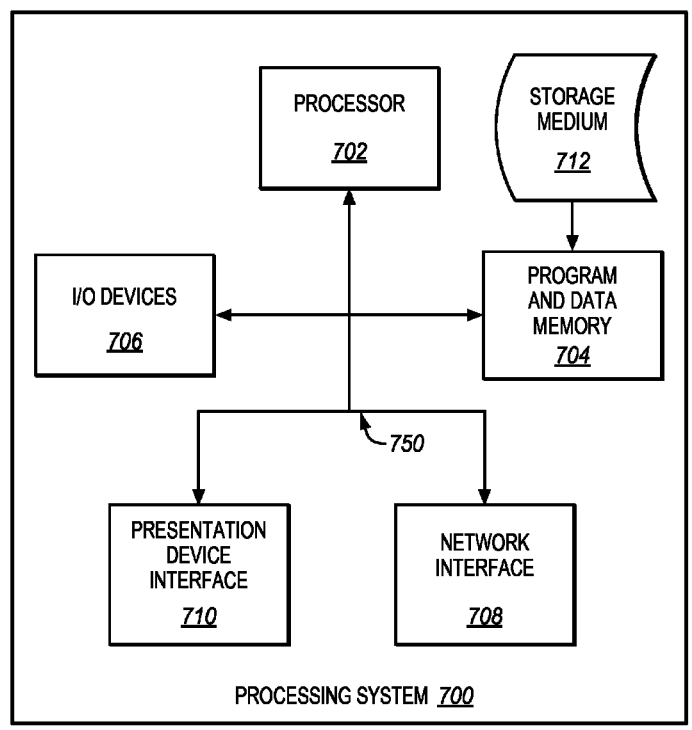
FIG. 7 illustrates an exemplary processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of an enhanced SAS expander to perform the various operations disclosed herein. FIG. 7 illustrates an exemplary processing system operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander, comprising:
   multiple physical links with associated transceivers (PHYs), wherein each PHY is operable to receive incoming Open Address Frames (OAFS) from SAS initiators that request connections with target devices;
   switching hardware operable to selectively link the PHYs of the expander with each other to enable connections between initiators and target devices;
   a memory; and
   a control unit operable to determine that a connection requested by a received OAF cannot be completed, operable to transmit an OPEN ACCEPT to the SAS initiator that transmitted the OAF responsive to making the determination, and operable to store incoming I/O received from the SAS initiator for the requested connection in the memory, responsive to transmitting the OPEN ACCEPT.

2. The SAS expander of claim 1 wherein:
   the control unit is further operable to determine that the connection is available, operable to propagate an OAF from a PHY of the expander toward the target device, operable to determine that an OPEN ACCEPT has been received at the PHY from the target device, and operable to generate I/O commands for the target device based on the stored I/O from the SAS initiator.

3. The SAS expander of claim 2 wherein:
the control unit is further operable to queue the stored I/O in the memory based on the order in which they were received, and to generate the I/O commands based on the order of the stored I/O from the SAS initiator.

4. The SAS expander of claim 2 wherein:
the control unit is further operable to provide responses to the generated I/O commands from the target device to the SAS initiator.

5. The SAS expander of claim 1 wherein:
The control unit is further operable to determine that a connection requested by a received OAF cannot be completed because a PHY of the expander used for the requested connection is already servicing a different connection.

6. The SAS expander of claim 5 wherein:
the control unit is further operable to determine that the PHY is no longer servicing the different connection, operable to propagate an OAF from the PHY to the target device, operable to determine that an OPEN REJECT has been received at the PHY, and operable to retry propagating an OAF from the PHY to the target device until an OPEN ACCEPT is received.

7. The SAS expander of claim 1 wherein:
the memory comprises double data rate type three synchronous dynamic random access memory (DDR3 SDRAM).

8. A method for operating a Serial Attached SCSI (SAS) expander comprising
multiple physical links with associated transceivers (PHYs), wherein each PHY is operable to receive incoming Open Address Frames (OAFS) from SAS initiators that request connections with target devices, the method comprising:
receiving, at the SAS expander, an OAF from a SAS initiator;
determining, at a control unit of the SAS expander, that a connection requested by the received OAF cannot be completed;
transmitting, via the expander, an OPEN ACCEPT to the SAS initiator that transmitted the OAF responsive to making the determination; and
storing incoming I/O received from the SAS initiator for the requested connection in a memory of the SAS expander, responsive to transmitting the OPEN ACCEPT.

9. The method of claim 8 further comprising:
determining, at the control unit, that the connection is available;
propagating, via the expander, an OAF from a PHY of the expander toward the target device;
determining, at the control unit, that an OPEN ACCEPT has been received at the PHY from the target device; and
generating, at the control unit, I/O commands for the target device based on the stored I/O from the SAS initiator.

10. The method of claim 9 further comprising:
queuing the stored I/O in the memory based on the order in which they were received; and
generating the I/O commands based on the order of the stored I/O from the SAS initiator.

11. The method of claim 9 further comprising:
providing responses to the generated I/O commands from the target device to the SAS initiator.

12. The method of claim 8 wherein:
determining that the requested connection cannot be completed comprises determining that a PHY of the expander used for the requested connection is already servicing a different connection.

13. The method of claim 12 further comprising:
determining, at the control unit, that the PHY is no longer servicing the different connection,
propagating, via the expander, an OAF from the PHY to the target device;
determining, via the control unit, that an OPEN REJECT has been received at the PHY; and
retrying propagating an OAF from the PHY to the target device until an OPEN ACCEPT is received.

14. The method of claim 8 wherein:
the memory comprises double data rate type three synchronous dynamic random access memory (DDR3 SDRAM).

15. A non-transitory computer readable medium embodying programmed instructions which, when executed by a processor, are operable for performing a method for operating a Serial Attached SCSI (SAS) expander comprising multiple physical links with associated transceivers (PHYs), wherein each PHY is operable to receive incoming Open Address Frames (OAFS) from SAS initiators that request connections with target devices, the method comprising:
receiving, at the SAS expander, an OAF from a SAS initiator;
determining, at a control unit of the SAS expander, that a connection requested by the received OAF cannot be completed;
transmitting, via the expander, an OPEN ACCEPT to the SAS initiator that transmitted the OAF responsive to making the determination; and
storing incoming I/O received from the SAS initiator for the requested connection in a memory of the SAS expander, responsive to transmitting the OPEN ACCEPT.

16. The non-transitory computer readable medium of claim 15, the method further comprising:
determining, at the control unit, that the connection is available;
propagating, via the expander, an OAF from a PHY of the expander toward the target device;
determining, at the control unit, that an OPEN ACCEPT has been received at the PHY from the target device; and
generating, at the control unit, I/O commands for the target device based on the stored I/O from the SAS initiator.

17. The non-transitory computer readable medium of claim 16, the method further comprising:
queuing the stored I/O in the memory based on the order in which they were received; and
generating the I/O commands based on the order of the stored I/O from the SAS initiator.

18. The non-transitory computer readable medium of claim 16, the method further comprising:
providing responses to the generated I/O commands from the target device to the SAS initiator.

19. The non-transitory computer readable medium of claim 15 wherein:
determining that the requested connection cannot be completed comprises determining that a PHY of the expander used for the requested connection is already servicing a different connection.

20. The non-transitory computer readable medium of claim 19, the method further comprising:
determining, at the control unit, that the PHY is no longer servicing the different connection,
propagating, via the expander, an OAF from the PHY to the target device;
determining, via the control unit, that an OPEN REJECT has been received at the PHY; and retrying propagating an OAF from the PHY to the target device until an OPEN ACCEPT is received.

* * * * *